United States Patent
Arai et al.

(10) Patent No.: US 7,172,713 B2
(45) Date of Patent: *Feb. 6, 2007

(54) SOLUTION CASTING PROCESS FOR PRODUCING POLYMER FILM

(75) Inventors: Toshinao Arai, Kanagawa (JP); Hidekazu Yamazaki, Kanagawa (JP); Hitoshi Ikeda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 396 days.

This patent is subject to a terminal disclaimer.

(21) Appl. No.: 10/720,537

(22) Filed: Nov. 25, 2003

(65) Prior Publication Data

US 2004/0104496 A1 Jun. 3, 2004

(30) Foreign Application Priority Data

Nov. 25, 2002 (JP) ............................. 2002-340808

(51) Int. Cl.
*B29C 35/02* (2006.01)
*B29C 41/00* (2006.01)
*C04B 40/00* (2006.01)
*B27N 3/08* (2006.01)

(52) U.S. Cl. ..................... 264/28; 264/82; 264/83; 264/556

(58) Field of Classification Search ............... 264/28, 264/82, 83, 556
See application file for complete search history.

(56) References Cited

U.S. PATENT DOCUMENTS 6,660,211 B2 * 12/2003 Topolkaraev et al. ....... 264/444

FOREIGN PATENT DOCUMENTS

| GB | 2 114 050 A | 8/1983 |
| JP | 2001-315147 A | 11/2001 |

* cited by examiner

*Primary Examiner*—Stephen J. Lechert, Jr.
(74) *Attorney, Agent, or Firm*—Sughrue Mion, PLLC

(57) ABSTRACT

A solution casting process for producing cellulose triacetate (TAC) film is provided. Bead of dope, which includes cellulose triacetate and solvent, is cast on to a rotating supporting drum, to form self-supporting cast film. The self-supporting cast film is stripped from the supporting drum. The self-supporting cast film is dried while the self-supporting cast film being stripped is fed by feed rollers, to form the cellulose triacetate film. A surface temperature of the feed rollers is set equal to or lower than 0° C. The self-supporting cast film upon being stripped has modulus of longitudinal elasticity equal to or more than 450,000 Pa.

15 Claims, 9 Drawing Sheets

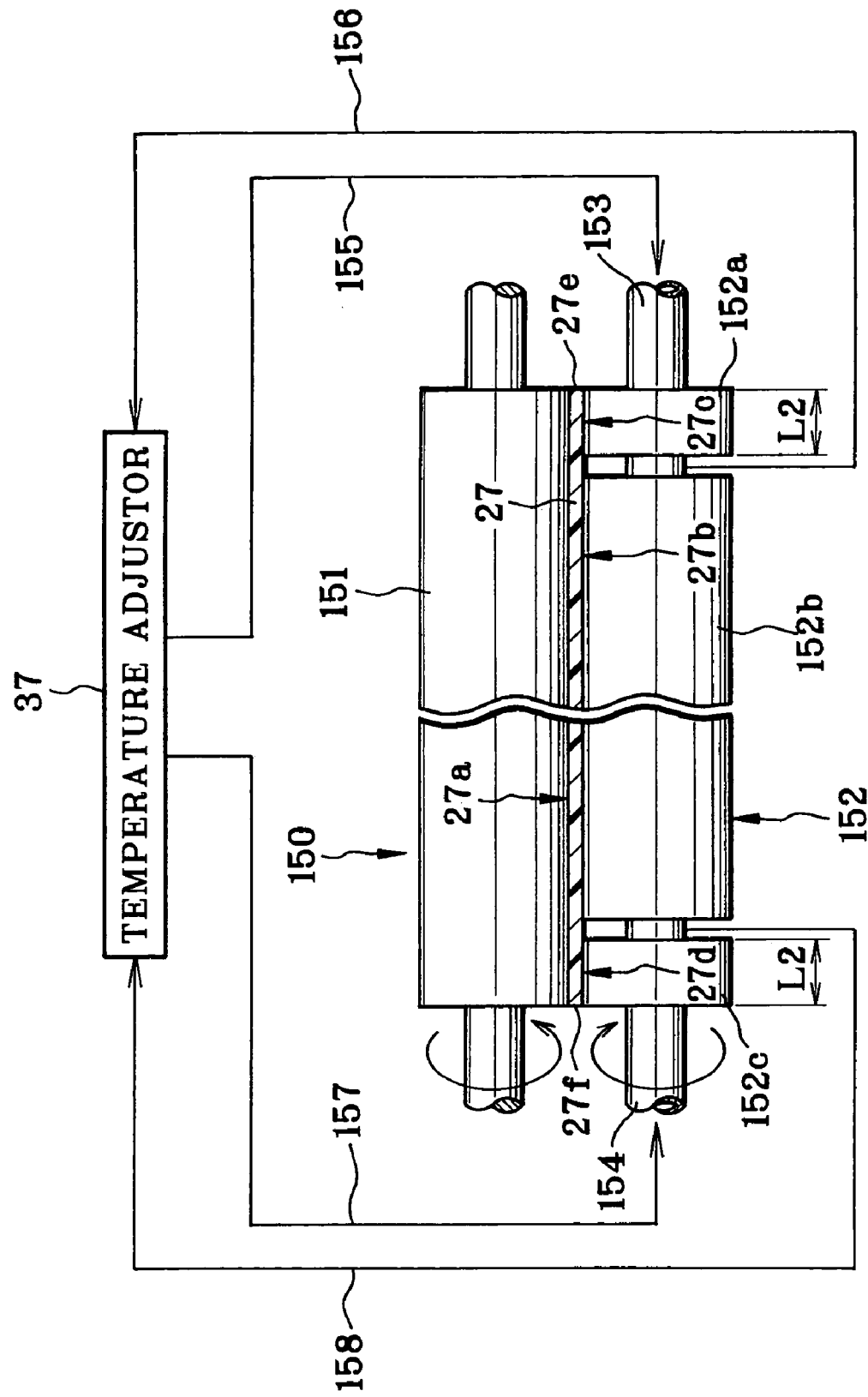

SOLUTION CASTING PROCESS FOR PRODUCING POLYMER FILM

BACKGROUND OF THE INVENTION

1. Field of the Invention

The present invention relates to a solution casting process for producing polymer film. More particularly, the present invention relates to a solution casting process for producing polymer film of which quality of surfaces can be high.

2. Description Related to the Prior Art

JP-A 2001-315147 discloses a solution casting process for producing polymer film. Examples of polymer films include cellulose triacetate (TAC) film, and other cellulose acylate films. The solution casting process is widely used to manufacture a liquid crystal display panel, photosensitive material, and the like. Today, the liquid crystal display panel has been marketed more and more widely. So the production of the polymer film is required to have higher efficiency. For example, a casting speed of the solution casting process is desired to be higher. A thickness of the polymer film is desired to be smaller. To obtain the TAC film as the polymer film, at first the cellulose triacetate is dissolved in a mixed solvent of which a main component is dichloro methane, to prepare polymer solution or dope. The dope is cast on a supporting surface, to form gel film. After this, the gel film comes to have a self-supporting characteristic on the supporting surface. A stripping roller is actuated to strip the gel film to obtain self-supporting cast film. Rollers are rotated to feed the self-supporting cast film into a tenter drier machine. The self-supporting cast film is subjected to extension, dried, to produce the polymer film.

However, the solubility of the cellulose acylate to solvent is very low. Considerable difficulty lies in raising density of solid content in the dope being prepared. It is conceivable to raise a speed of solution casting or to reduce thickness of the polymer film for the purpose of raising productivity. However, shortcomings arise in low strength of the gel film, occurrence of curls in the self-supporting cast film before feeding to the tenter drier machine after stripping from the supporting surface, and occurrence of wrinkles on surfaces of the self-supporting cast film. A pair of lateral edge portions of the polymer film is supported inside the tenter drier machine without using rollers for the purpose of feeding. If curls occur on the lateral edge portions in the polymer film, a problem is likely to arise in an unstable state of the supporting operation of the lateral edge portions. If considerably large curls occur, there will be a failure in entry in the tenter drier machine. Continuous actuation of a system for producing the polymer film may be stopped accidentally. If wrinkles are created on the surfaces of the self-supporting cast film before being dried, residue of wrinkles will be present on the surfaces of the polymer film as a product, to lower the quality. This will cause a serious problem in that yield in the production will be too low due to temporarily low quality.

SUMMARY OF THE INVENTION

In view of the foregoing problems, an object of the present invention is to provide a solution casting process for producing polymer film, capable of suppressing wrinkles on the self-supporting cast film, curls on the self-supporting cast film, or residual adhesion of the self-supporting cast film to any of rollers.

Another object of the present invention is to provide a solution casting process for producing polymer film, capable of efficiently producing the polymer film having high quality in its surfaces and optical characteristics even with a small thickness.

In order to achieve the above and other objects and advantages of this invention, a solution casting process is provided. Bead of dope is cast on to a support by use of at least one solution casting die, to form self-supporting cast film, the dope including polymer and solvent. The self-supporting cast film is stripped from the support. The self-supporting cast film is dried by use of a drier while the self-supporting cast film being stripped is fed by at least one feed roller, to form polymer film. A surface temperature of the feed roller is set equal to or lower than 0° C. The self-supporting cast film upon being stripped has modulus of longitudinal elasticity equal to or more than 450,000 Pa.

Furthermore, while the self-supporting cast film is fed, gas is blown on the self-supporting cast film, the gas having a temperature equal to or lower than 0° C.

The self-supporting cast film has thickness of 30 microns or more upon being stripped.

The self-supporting cast film includes first and second surfaces, and the first surface is separated from the support. The gas is dry gas, and blown on the second surface, so as to determine a drying speed difference (dW/dt) between the first and second surfaces equal to or less than 0.05 kg solvent per kg of solid per second.

Furthermore, while the self-supporting cast film is fed, a first surface of the self-supporting cast film is pressed by use of a rotatable decurling roller, to prevent occurrence of a curl on the self-supporting cast film, the first surface having been separated from the support.

Furthermore, a surface temperature of the decurling roller is set equal to or lower than 0° C., so as to determine a drying speed difference (dW/dt) between the first surface and a second surface of the self-supporting cast film equal to or less than 0.05 kg solvent per kg of solid per second, the second surface being reverse to the first surface.

The casting step is according to at least one of multi-manifold solution casting and successive solution casting. The dope comprises first to Nth dopes, the first dope has higher density than the second to Nth dopes, and is cast in a range extending to have two lateral edge portions of the self-supporting cast film, to provide the two lateral edge portions with the modulus of longitudinal elasticity equal to or more than 450,000 Pa.

N is 3, and the self-supporting cast film includes a first film layer, formed by casting the second dope, having a small region defined between the two lateral edge portions with respect to a width direction. A second film layer is overlaid on the first film layer by casting the first dope, disposed to protrude from edges of the first film layer in the width direction, for constituting the lateral edge portions. A third film layer is overlaid on the second film layer by casting the third dope, and has a region substantially corresponding to the first film layer with respect to the width direction.

Thickness A of two lateral edge portions of the self-supporting cast film upon being stripped is in a range of 30–560 microns.

Furthermore, the two lateral edge portions is formed with the thickness A larger than thickness of a middle portion of the self-supporting cast film disposed between the two lateral edge portions.

The solution casting die includes a manifold supplied with the dope. A die lip has a first size corresponding to the self-supporting cast film in a width direction thereof, for forming the bead from the dope. There is a die channel for flow of the dope from the manifold to the die lip, having a deckle surface extending toward the lip from the second size to the first size with an inclination as viewed in the width direction, for setting the thickness A larger in the two lateral edge portions.

The self-supporting cast film is so formed that a ratio A/B of the thickness A to thickness B is in a range of 1–5, where the thickness B is the thickness of the middle portion upon being stripped.

The self-supporting cast film includes a first film layer, having a greater thickness in the two lateral edge portions than in the middle portion. A second film layer is overlaid on the first film layer. A third film layer is overlaid on the second film layer, and has a greater thickness in the two lateral edge portions than in the middle portion.

The self-supporting cast film includes first and second surfaces, and the first surface is separated from the support. Furthermore, while the self-supporting cast film is fed, two lateral edge portions of the second surface are kept at temperature equal to or lower than a condensation temperature of gas of the solvent in atmosphere, so as to condense and collect the gas of the solvent thereon.

The drier is constituted by a tenter drier machine, and the self-supporting cast film is squeezed in an entrance of the tenter drier machine.

The tenter drier machine is adapted to apply tension to the two lateral edge portions with an inclination.

The feed roller includes a middle roll for contacting at least a middle portion of the second surface. First and second chill rolls are secured to respectively first and second ends of the middle roll, for contacting and cooling first and second lateral edge portions of the second surface. Furthermore, the self-supporting cast film is nipped by contact of a rotatable, second feed roller with the first surface in cooperation with the feed roller.

The tenter drier machine extends the self-supporting cast film at an extension ratio in a range of 1–20% in a width direction, and dries the self-supporting cast film at a temperature in a range of 80–140° C. for a period in a range of 10–180 seconds.

The tenter drier machine volatilizes the solvent in the self-supporting cast film at a volatilizing amount W1 in a range of −0.05–1 kg solvent per kg of solid.

The feed roller has a surface roughness Ra in a range of 0.05–0.5 micron.

The at least one feed roller comprises first and second feed rollers, the second feed roller is positioned directly downstream from the first feed roller with reference to a feeding direction of the self-supporting cast film, the first and second feed rollers rotate at respectively peripheral speeds V1 and V2, and a ratio V2/V1 is in a range of 1.0025–1.15.

A straining rate of extension of the self-supporting cast film is $1.4 \times 10^{-4}$ (1/s).

A surface of the feed roller has a coefficient $\mu 0$ of static friction in a range of 0.036–0.044, and a coefficient $\mu$ of dynamic friction in a range of 0.018–0.022.

The polymer is cellulose acylate.

The two lateral edge portions have respectively a size of 10 mm in a width direction perpendicular to the feeding direction of the self-supporting cast film. The at least one feed roller comprises at least first and second feed rollers arranged in a feeding direction.

At least one third feed roller is disposed opposite to the first and second feed rollers with respect to the self-supporting cast film, and positioned between the first and second feed rollers with reference to the feeding direction.

In one preferred embodiment, the dope comprises first to Nth dopes, and the solution casting die is a multi-manifold solution casting die.

In another preferred embodiment, the dope comprises first to Nth dopes. Furthermore, there is convergence of the first to Nth dopes supplied through plural conduits, for entry into the solution casting die.

In still another preferred embodiment, the dope comprises first to Nth dopes, and the at least one solution casting die comprises plural solution casting dies arranged in a feeding direction for successive solution casting.

BRIEF DESCRIPTION OF THE DRAWINGS

The above objects and advantages of the present invention will become more apparent from the following detailed description when read in connection with the accompanying drawings, in which:

FIG. 12 is an explanatory view in elevation, illustrating a set of feed rollers including two chill rolls at lateral ends.

DETAILED DESCRIPTION OF THE PREFERRED EMBODIMENT(S) OF THE PRESENT INVENTION

[Solvents]

Figure 1:
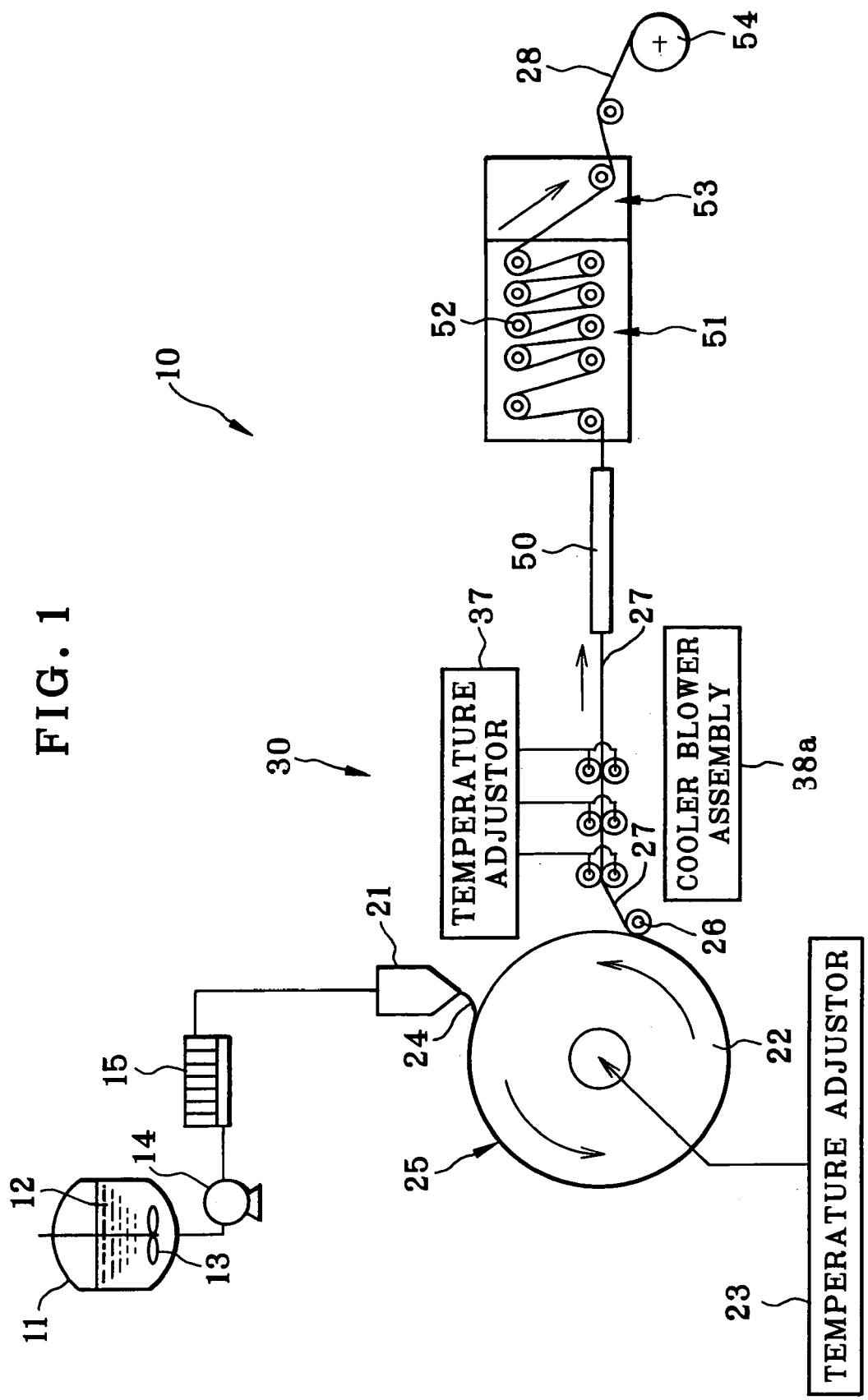
FIG. 1 is an explanatory view in elevation, illustrating a polymer film producing system for a solution casting process.

Solvent for preparing dope for use in the solution casting process of the invention may be any suitable known type in the field of solvent. Examples of solvents include halogenated hydrocarbons, such as dichloro methane (methylene chloride); esters, such as methyl acetate; ethers; alcohols, such as methanol, ethanol, and n-butanol; and ketones, such as cetone. Also, it is possible to prepare dope by mixing two or more types of solvents, for the purpose of forming polymer film.

[Polymers]

Any suitable polymers may be used in the present invention. Particularly preferred examples are cellulose acylates. A desirable example of cellulose acylate is cellulose triacetate (TAC) of which a ratio of acetylation is 59.0–62.5%. The TAC film being used, an optical film, polarizing plate and liquid crystal display panel are characteristically excellent in view of optical performance and stability in dimensions.

[Additives]

Additives of any suitable known types may be mixed with the dope. Examples of the additives include plasticizers such as triphenyl phosphate (TPP), and biphenyl diphenyl phosphate (BDP); ultraviolet absorbers such as oxy benzophenone compounds, and benzo triazole compounds; matte materials such as silicon dioxide; thickeners; and oil gelling agents, such as cyclohexane diamine derivative. Any of those can be mixed simultaneously with the polymer at the time of preparing the dope. Otherwise, additives can be mixed after the preparation of the dope in a manner of the in-line mixture by use of a static type of mixer during the transfer of the dope. Note that a term of the solid content is used herein to refer to a combination of the polymer and the additives.

[Preparation of Dope]

The above-described solid content inclusive of the polymer and additives is added to the solvent, and dissolved by any of known dissolving methods, to prepare dope. In general, the dope is filtrated to eliminate foreign material. For the purpose of the filtration, it is possible to use filter paper, filter cloth, non-woven fabric, metallic mesh, sintered metal, porous plate, and other known filter mediums. The filtration can eliminate undissolved material in the dope as well as foreign material. Failure or occurrence of defects can be avoided when polymer film as product is completed.

Furthermore, it is possible after the dissolution to heat the dope for the purpose of raising solubility. Examples of methods of heating include heating in stirring the dope in a stationarily disposed tank, and heating in transferring the dope by use of a multi-pipe heat exchanger, a heat exchanger of a jacket pipe with a stationary mixer, or other heat exchangers. Also, a cooling step for cooling the dope may be added after the heating step. In addition, the inside of the device may be pressurized to heat the dope to a temperature higher than its boiling point. According to those steps, undissolved material of fine particles can be dissolved completely. It is possible to reduce an amount of foreign material of film, and reduce load of the filtration. Note that the solid content can be included in the dope in a range of 20–25 wt. % because the gel film can be provided with sufficient strength, or modulus of longitudinal elasticity, at the time of stripping the gel film from the supporting surface. However, the solid content may be included at a ratio of any suitable value. Furthermore, it is preferable to add oil gelling agent to the polymer in a range of 0.1–2 wt. % for the purpose of raising the film strength.

[Solution Casting Process]

Figure 2:
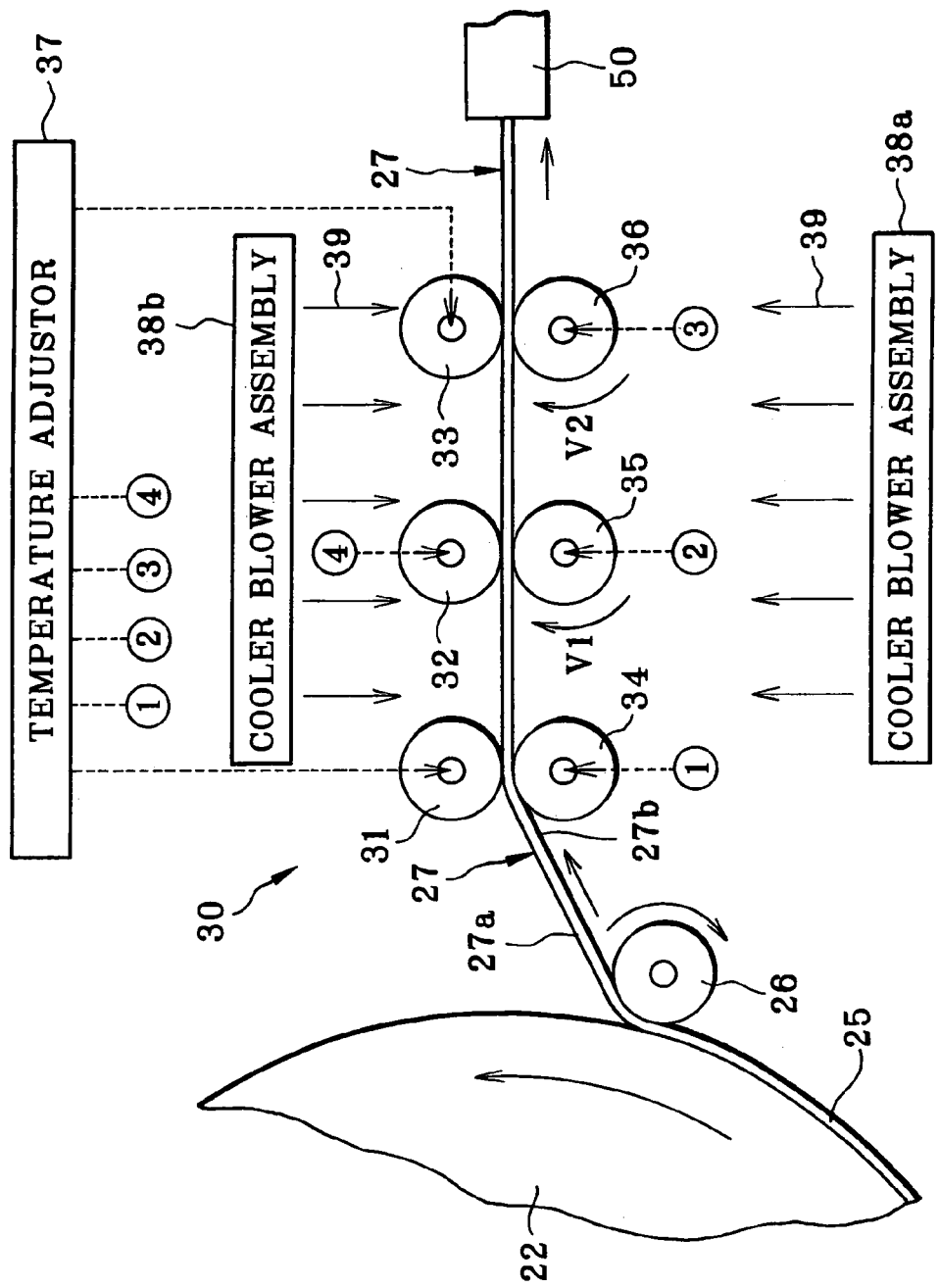
FIG. 2 is an explanatory view illustrating a transition unit in the polymer film producing system.

In FIG. 1, a polymer film producing line or producing system 10 for a solution casting process is illustrated. In FIG. 2, a transition unit 30 included in the polymer film producing system 10 as an important component is illustrated in enlargement. Dope 12 prepared in the above-described manner is contained in a mixing tank 11. Stirring wings 13 are rotated by a motor (not shown), and stir the dope 12 in a uniform manner. A pump 14 sends the dope 12 to a filtration device 15, which eliminates foreign material from the dope 12. Then the dope 12 is sent to a solution casting die 21 at a constant flow rate. There is a rotating supporting drum 22 as a support disposed under the solution casting die 21. A drive mechanism (not shown) with a motor drives the supporting drum 22 for rotation in an endless manner. A temperature adjustor 23 can be preferably connected with the supporting drum 22, to adjust the surface temperature of the supporting drum 22. A chill casting is best preferred as a mode of the solution casting of the invention. The surface of the supporting drum 22 can be preferably kept cooled in a range from −10° C. to 0° C. A moving speed of the supporting drum 22 can be set in any value in a range of 10–200 meters per minute. Also, production of the polymer film is possible at as high a speed as 50–150 meters per minute.

Bead 24 of the dope 12 is cast from the solution casting die 21 to the supporting drum 22 preferably to obtain a dried polymer film as product with a thickness of 15–150 microns. The construction of the invention is effective in quickly producing a polymer film with a thickness of 15–60 microns, namely so-called thin film. Gelling of the bead 24 proceeds on the supporting drum 22, to obtain gel film 25. When the gel film 25 is cooled and moved in the course of rotation of the supporting drum 22, gelling of the gel film 25 proceeds to a further extent, to impart a self-supporting characteristic to the gel film 25. A stripping roller 26 strips the gel film 25 from the supporting drum 22, to form self-supporting cast film or soft film 27.

The self-supporting cast film 27, obtained by stripping the gel film 25 from the supporting drum 22, is caused to keep a modulus of longitudinal elasticity of 450,000 Pa or more. This is effective in suppressing unstable feeding of the self-supporting cast film 27 in the transition unit 30, for example suppressing occurrence of wrinkles or curls of the self-supporting cast film 27, or residual adhesion of the self-supporting cast film 27 to rollers. Also, the control of the modulus of longitudinal elasticity can easily eliminate wrinkles and curls even if they have occurred. The processes of keeping the film strength and elimination of wrinkles or curls will be later described. Note that a value of the modulus of the longitudinal elasticity of the self-supporting cast film 27 should be preferably a value measured in extension by use of a load cell.

As described above, the self-supporting cast film 27 can preferably have the modulus of longitudinal elasticity of 450,000 Pa or higher so that occurrence of wrinkles or curls can be suppressed in the course of feeding the self-supporting cast film 27. The modulus can be more preferably 600,000 Pa or higher, and desirably 750,000 Pa or higher. Should the modulus of longitudinal elasticity be 450,000 Pa or lower, the flexural rigidity will be too low, and occurrence of curls cannot be suppressed. Also, a thickness of the self-supporting cast film 27 at the stripping time can be 30 microns or more for the purpose of preventing occurrence of wrinkles due to flexing and deformation of the self-supporting cast film 27. The self-supporting cast film 27 according to the invention has the thickness of 30 microns or more, preferably 30–550 microns, and desirably 50–350 microns.

There are upper feed rollers 31, 32 and 33, and lower feed rollers 34, 35 and 36 disposed in the transition unit 30. Those are caused to rotate by a drive mechanism (not shown). The lower feed roller 34 is opposed to the upper feed roller 31. Note that a first one of the opposed feed rollers 31 and 34 may be directly driven, while a second one of those may be originally free and caused to rotate by movement of the self-supporting cast film 27 in the rotation of the first. This applies also to a combination of the opposed feed rollers 32 and 35, and the opposed feed rollers 33 and 36. Let Ra (microns) be a surface roughness of the feed rollers 31–36. The feed rollers 31–36 satisfy a condition of $0.05 \leq Ra \leq 0.5$, preferably $0.1 \leq Ra \leq 0.4$, and desirably $0.2 \leq Ra \leq 0.3$. The construction with this range can suppress residual adhesion between the self-supporting cast film 27 and any of the feed rollers 31–36. Should the surface roughness of the feed rollers 31–36 be 0.05 micron or less, force of adhesion to the self-supporting cast film 27 will be higher, to obstruct smooth movement of the self-supporting cast film 27. Should the surface roughness be 0.5 micron or more, a problem will arise in that fine streaks or lines of the feed rollers 31–36 due to polishing will transfer to the self-supporting cast film 27, to degrade its surface.

Surfaces of the feed rollers 31–36 can have a static friction coefficient $\mu 0$ and a dynamic friction coefficient determined appropriately in order to suppress occurrence of wrinkles on the self-supporting cast film 27. The static friction coefficient $\mu 0$ and the dynamic friction coefficient $\mu$ are herein defined between steel and the roller surfaces. Those can satisfy conditions of $0.036 \leq \mu 0 \leq 0.044$, and $0.018 \leq \mu \leq 0.022$, preferably conditions of $0.038 \leq \mu 0 \leq 0.042$, and $0.019 \leq \mu \leq 0.021$, and desirably conditions of $0.039 \leq \mu 0 \leq 0.041$, and $0.0195 \leq \mu \leq 0.0205$. Should $\mu 0$ be 0.036 or less, it is likely that the self-supporting cast film 27 will move in its width direction between the lower feed rollers 35 and 36 to create deformation of flexing because of shrinking force in drying. Should $\mu 0$ be 0.044 or more, the self-supporting cast film 27 will be extended too much on the rollers. The self-supporting cast film 27 will be deformed directly after the contact on the rollers, to create wrinkles due to force of the retention on the rollers.

The feed rollers 31–36 disposed in the transition unit 30 as depicted in the drawings make it possible to subject the self-supporting cast film 27 to extension by suitably setting a difference between peripheral speeds of two adjacent pairs of rollers, to prevent occurrence of wrinkles. Let V1 be a peripheral rotational speed of the lower feed roller 35. Let V2 be a peripheral rotational speed of the lower feed roller 36 that is directly downstream from the lower feed roller 35. The lower feed rollers 35 and 36 operate in satisfying a condition of $1.0025 \leq V2/V1 \leq 1.1500$, preferably $1.005 \leq V2/V1 \leq 1.10$, and desirably $1.01 \leq V2/V1 \leq 1.05$. Should V2/V1 be 1.0025 or less, force of extension applied to the self-supporting cast film 27 will be too low, and cause residual adhesion of the self-supporting cast film 27 to the rollers. Should V2/V1 be 1.1500 or more, it is likely that wrinkles will occur. Furthermore, it is possible to control three (3) rollers or three (3) pairs of rollers by suitably setting the ratio between the peripheral rotational speeds, so as to suppress occurrence of wrinkles more reliably. Let a be the number of rollers or number of pairs of rollers as viewed in the feeding direction. Let $V_n$ be a peripheral rotational speed of the any first one of the a rollers. Let $V_{n+1}$ be a peripheral rotational speed of a second one of the a rollers that is directly downstream from the first. The first and second rollers operate in satisfying a condition of $1.0025 \leq V_{n+1}/V_n \leq 1.15$, preferably $1.005 \leq V_{n+1}/V_n \leq 1.10$, and desirably $1.01 \leq V_{n+1}/V_n \leq 1.05$. Note that a and n satisfy $a \leq 2$, and $1 \leq n \leq a-1$.

The straining rate in the extension of the self-supporting cast film 27 can be set as high a value of $1.4 \times 10^{-4}$ (1/s) or more by suitably determining a ratio between the peripheral speeds V1, V2, $V_n$ and $V_{n+1}$ of adjacent rollers among the feed rollers 31–36. Stress in occurrence on the self-supporting cast film 27 can be raised to suppress residual adhesion of the self-supporting cast film 27 on the feed rollers 31–36. Should the straining rate in the extension of the self-supporting cast film 27 be $1.4 \times 10^{-4}$ (1/s) or less, suppression of the residual adhesion of the self-supporting cast film 27 on the feed rollers 31–36 will be insufficient. The straining rate in the extension of the self-supporting cast film 27 according to the invention can be preferably $1.4 \times 10^{-3}$ (1/s) or more, and desirably $1.4 \times 10^{-2}$ (1/s) or more.

The self-supporting cast film 27 is cooled by lowering the surface temperature of the feed rollers 31–36 in the transition unit 30. This is effective in raising flexural rigidity of the self-supporting cast film 27, to suppress curls of the self-supporting cast film 27. A temperature adjustor 37 is preferably used for adjusting the surface temperature of the feed rollers 31–36. The roller temperature is set by the temperature adjustor 37 at 0° C. or lower. When the self-supporting cast film 27 contacts the feed rollers 31–36, heat is transmitted from the self-supporting cast film 27 to the feed rollers 31–36. This absorption of the heat adjusts the temperature of the self-supporting cast film 27. This is effective in raising the film strength or modulus of longitudinal elasticity of the self-supporting cast film 27. Should the roller temperature be 0° C. or higher, it is likely that increase in the film strength will be insufficient, and a small curl will occur. Note that the roller temperature can be preferably –10° C. or lower, and desirably –20° C. or lower. The self-supporting cast film 27 includes a first surface 27a and a second surface 27b. The first surface 27a is a side having contacted the supporting drum 22 at the time of the gel film 25. The second surface 27b is reverse to the first surface 27a. It is possible to adjust the temperature of only the upper feed rollers 31–33 without adjusting the temperature of the lower feed rollers 34–36. Of course, only the temperature of the lower feed rollers 34–36 can be adjusted without adjusting the temperature of the upper feed rollers 31–33.

Also, for adjusting the temperature of the self-supporting cast film 27, it is further preferable to blow cold gas or air 39 to the self-supporting cast film 27 by use of cooler blower assemblies 38a and 38b including a blower. See FIG. 2. The cold gas 39 has temperature of 0° C. or lower, so that it is possible in the self-supporting cast film 27 to keep the modulus of longitudinal elasticity at 450,000 Pa or more in the course of feeding in the transition unit 30. This is effective in raising the flexural rigidity of the self-supporting cast film 27 and in preventing occurrence of curls. Note that the cooler blower assembly 38b for the first surface 27a may be used as a single machine being the cooler blower assembly 38a for the second surface 27b. To this end, a cooler blower assembly can be associated with two gas conduits for blowing in two positions. Of course, two separate cooler blower assemblies 38a and 38b may be used as depicted. Only the first surface 27a may be blown with the cold gas 39. However, it is the most preferable to blow both of the first and second surfaces 27a and 27b as illustrated in FIG. 2. Note that the cold gas 39 can have temperature of preferably –10° C. or lower, and desirably –20° C. or lower.

It is noted that the term of cooler blower assembly is herein used to represent a combined device, which is supplied with air or other suitable gas as cooling medium, and includes a section for adjusting temperature of the gas, a section for adjusting humidity of the gas, and a blower of which a flow rate is controllable.

The cold gas 39 is blown to the second surface 27b to promote drying of the second surface 27b. The drying speed difference dW/dt in the drying speed between the first and second surfaces 27a and 27b can be reduced to suppress occurrence of curls, even though the first surface 27a is wetter, namely includes more solvent than the second surface 27b. The drying speed difference dW/dt is equal to or less than 0.05 kg solvent per kg of solid per second, and preferably equal to or less than 0.03 kg solvent per kg of solid per second, and desirably equal to or less than 0.01 kg solvent per kg of solid per second. Note that the value of W herein is determined as a ratio of mass of the solvent in the self-supporting cast film 27 to mass of the solid content in the same. Preferred example of the cold gas 39 is dry gas of which humidity is 5% or less.

A tenter drier machine 50 as a drier is positioned downstream from the transition unit 30 as illustrated in FIG. 1, for the purpose of further drying the self-supporting cast film 27. The occurrence of curls on the self-supporting cast film 27 has been suppressed as described heretofore. Thus, no error in the entry and squeezing of the self-supporting cast film 27 into the tenter drier machine 50 will occur at its entrance. It is preferable in the tenter drier machine 50 to dry the self-supporting cast film 27 at a temperature in a range of 80–140° C. for a period determined in a range of 10–180 seconds. The self-supporting cast film 27 is extended in the width direction in a range of 1–20% to flatten the self-supporting cast film 27 by eliminating its remaining curl. The flattening effect might be insufficient if the extension in the width direction is 1% or less, or if the temperature is 80° C. or lower, or if the drying continues only for 10 seconds or less. However, the values of those parameters may be determined as desired in satisfying the condition of the present invention.

Let W1 (kg solvent per kg solid) be a volatilized component of the self-supporting cast film 27. The operation of the tenter drier machine 50 can preferably satisfy the condition of $0.05 \leq W1 \leq 1$ while the self-supporting cast film 27 is dried in the tenter drier machine 50. In a region of a smaller amount of the volatilized component, interactions between molecules of the polymer are likely to occur due to the small amount of the solvent. Specifically when the polymer is cellulose triacetate (TAC), these interactions will occur with higher possibility. Accordingly, stress to the self-supporting cast film 27 is higher than a region of a greater amount of the volatilized component. Should W1 be lower than 0.05 kg solvent per kg solid, it is likely that extension of the self-supporting cast film 27 will be extremely difficult. Should W1 be higher than 1 kg solvent per kg solid, it is likely that removal of wrinkles or curls will be insufficient.

Polymer film 28 is created and fed out of the tenter drier machine 50 by drying the self-supporting cast film 27. There are a number of rollers 52 arranged in a drying chamber 51 as a drier. The polymer film 28 is sent into the drying chamber 51. The rollers 52 are engaged with the polymer film 28, and transport the polymer film 28 while the polymer film 28 is dried. A preferable temperature of the drying chamber 51 is in a range of 100–150° C. A preferable drying period of time is in a range of 5–20 minutes. There is a cooling chamber 53 for cooling the polymer film 28 down to a room temperature. Then a winder 54 downstream from the cooling chamber 53 winds the polymer film 28 in a roll form. It is preferable in the cooling chamber 53 to set a cooling temperature at approximately 25° C. that is a room temperature. However, the cooling temperature associated with the cooling chamber 53 according to the invention may be higher than 25° C., for example, may be as high as approximately 60° C. Furthermore, it is possible in the invention to subject the polymer film 28 to slitting away of lateral edge portions, knurling or the like before being wound. Note that a polymer film producing line according to the invention is not limited to that depicted in FIGS. 1 and 2.

Figure 3:
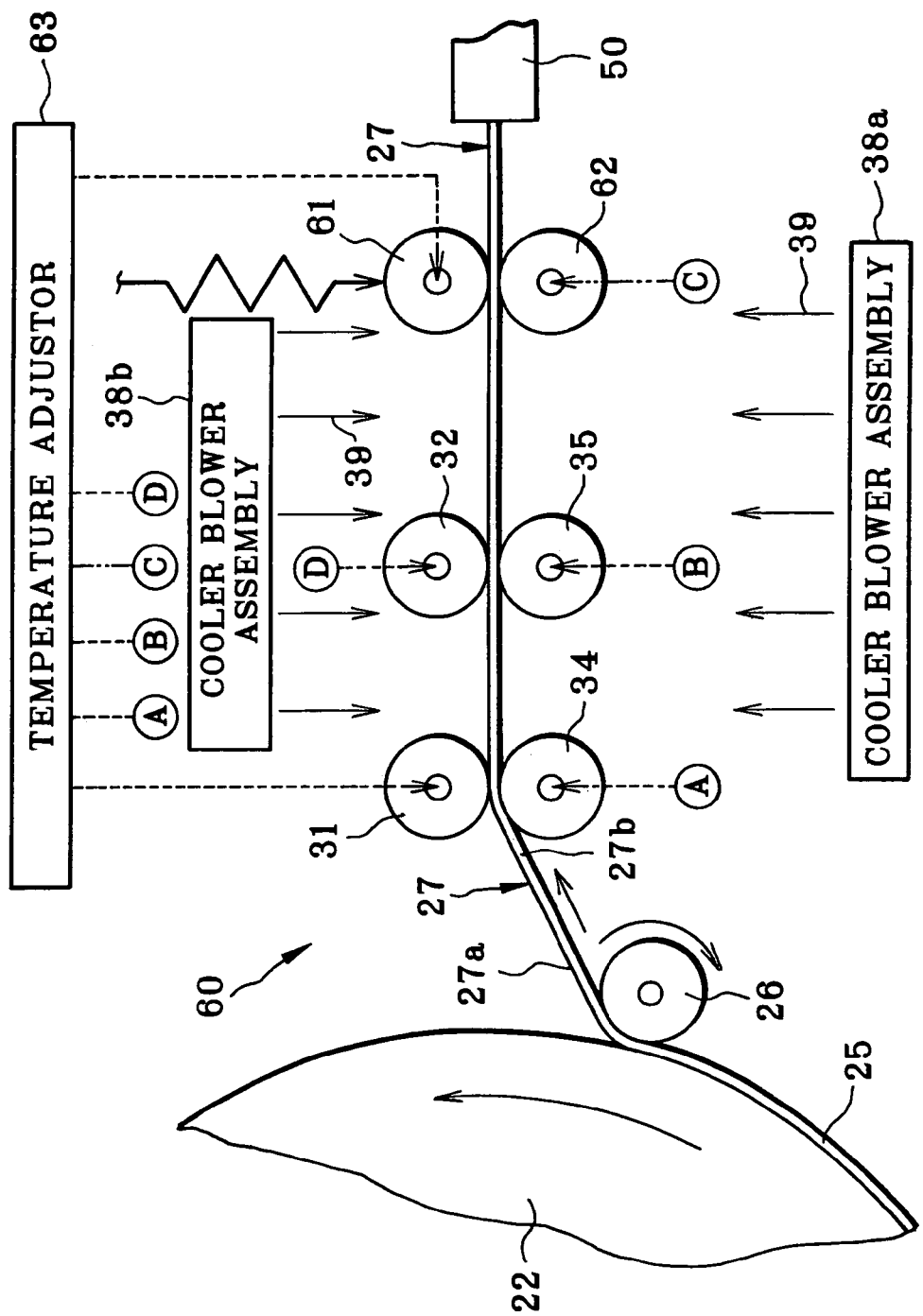
FIG. 3 is an explanatory view illustrating another preferred transition unit capable of film decurling.

FIG. 3 is now referred to, to describe another preferred embodiment of a solution casting process of the invention. Elements similar to those of the polymer film producing system 10 in FIGS. 1 and 2 are designated with identical reference numerals. In FIG. 3, there is a transition unit 60, where a decurling roller 61 and a backup roller 62 are opposed to each other for nipping the self-supporting cast film 27. The decurling roller 61 is disposed to face the first surface 27a, and eliminates curls from the self-supporting cast film 27 by nipping. Pressure of the nipping may be any suitable value. A preferable value of the nipping pressure is 0.1–1 kPa, which is effective in eliminating curls to impart good quality to film surfaces. The self-supporting cast film 27 is nipped and decurled before entry into the tenter drier machine 50. This prevents failure in squeezing of the self-supporting cast film 27 in the entry to the tenter drier machine 50.

It is to be noted that only a first one of the decurling roller 61 and the backup roller 62 can be rotated by use of a motor. The second of those can be rotated by feeding of the self-supporting cast film 27. However, two separate mechanisms with a motor may be used to cause the decurling roller 61 and the backup roller 62 respectively to rotate.

In FIG. 3, a temperature adjustor 63 is used to cool a surface of the decurling roller 61 down to 0° C. or lower. This is effective in suppressing drying of the self-supporting cast film 27 on the side of the first surface 27a including more solvent, and effective in reducing a difference between drying speeds of the first and second surfaces 27a and 27b. Prevention of curls can be ensured. The drying speed difference dW/dt between the drying speeds is 0.05 kg solvent per kg of solid per second, preferably 0.03 kg solvent per kg of solid per second, and desirably 0.01 kg solvent per kg of solid per second.

Figure 4:
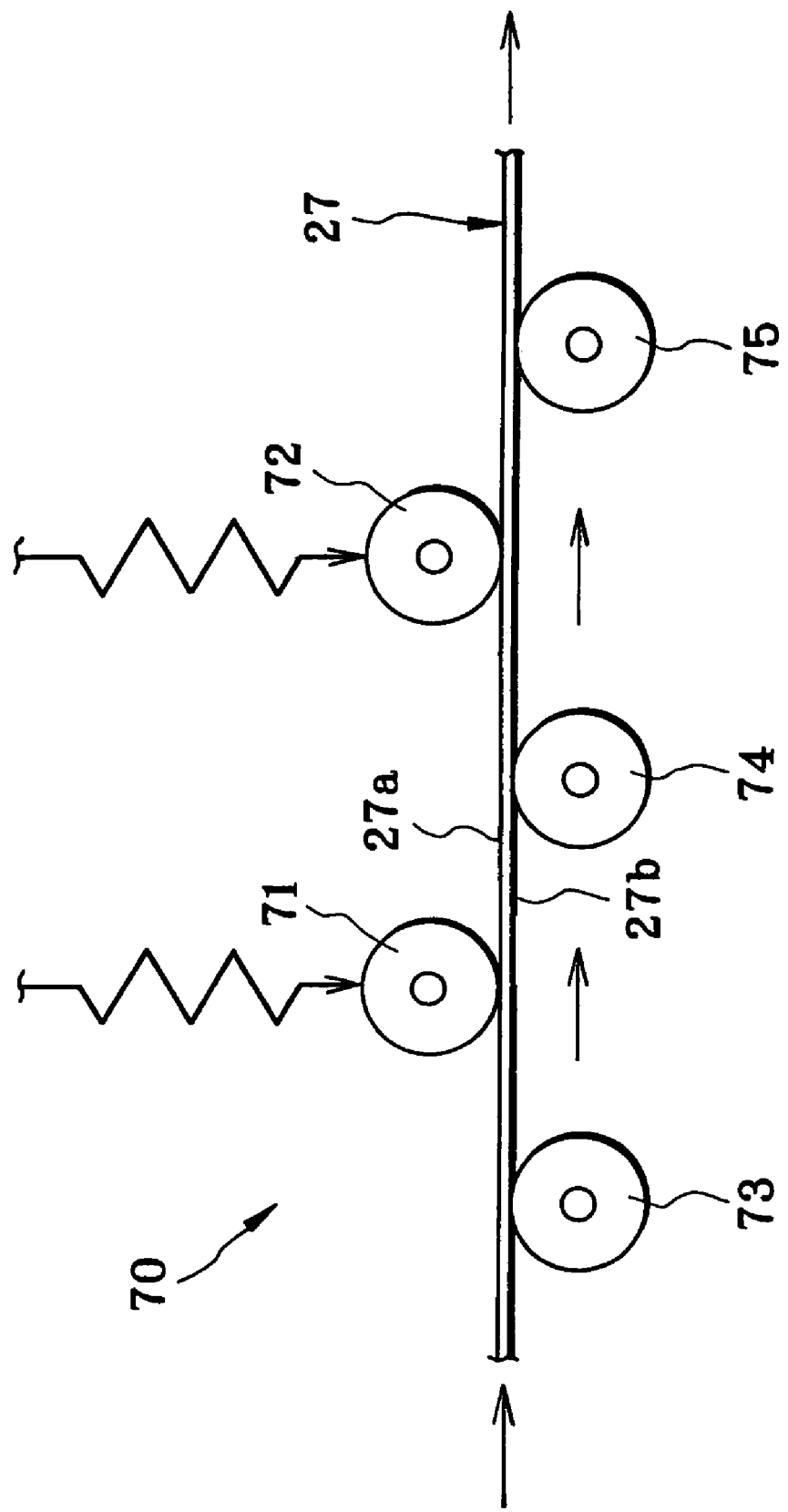
FIG. 4 is an explanatory view in elevation, illustrating another preferred arrangement of rotatable rollers arranged in a zigzag.

In FIGS. 1, 2 and 3, the feed rollers in the transition unit 30, 60 are combined in the manner of pairs each of which is positioned perpendicular to the self-supporting cast film 27. However, feed rollers may be disposed differently. In FIG. 4, another preferred embodiment is illustrated. Elements similar to those in the polymer film producing system 10 of FIGS. 1 and 2 are designated with identical reference numerals. A transition unit 70 contains upper decurling rollers 71 and 72 for nipping, and lower rotatable rollers 73, 74 and 75 disposed in a zigzag manner relative to the upper decurling rollers 71 and 72 on an opposite side with respect to the self-supporting cast film 27. The disposition of the decurling and rotatable rollers 71–75 suppresses occurrence of curls because of downward force applied to the second surface 27b. If a curl occurs, it is easily possible to decurl the self-supporting cast film 27. Note that, in the embodiment of FIG. 4, a temperature adjustor, and a cooler blower assembly can be used. The rollers may be associated with a drive mechanism (not shown). Any suitable one of the rollers may be designated for direct connection with the drive mechanism.

[Multi-Layer Solution Casting Process]

The solution casting process of the one-layer type has been described heretofore according to the solution casting die 21 for the one-layer solution casting. However, a solution casting process of the invention is not limited to that illustrated in FIGS. 1–4. For example, a supporting belt or band can be used instead of the supporting drum 22 as a support. Other embodiments are hereinafter described with reference to drawings. Elements similar to those of the polymer film producing system 10 in FIG. 1 are designated with identical reference numerals.

Figure 5:
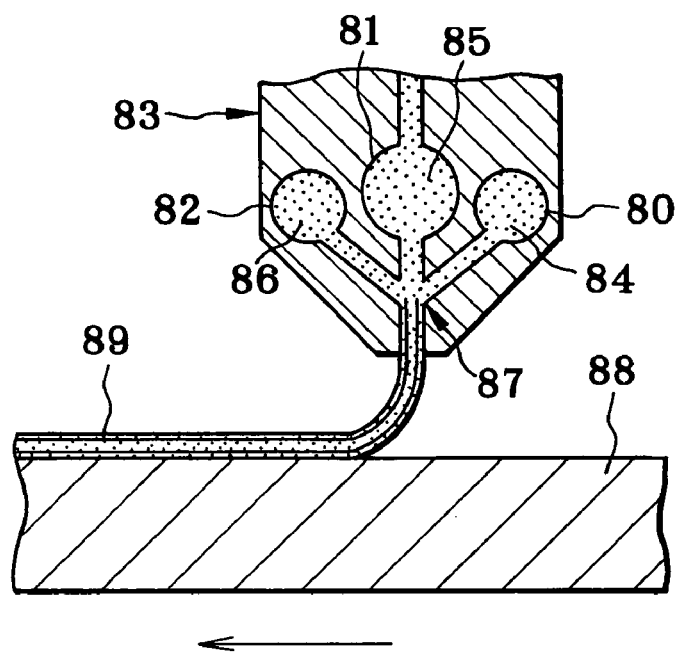
FIG. 5 is a cross section, partially broken, illustrating a multi-manifold solution casting die.

In FIG. 5, another preferred solution casting process of a simultaneous type or multi-manifold type of the invention is illustrated. A multi-manifold solution casting die 83 includes plural manifolds 80, 81 and 82, which are supplied with respectively dope 84, high-density dope 85 and dope 86.

There is a convergence point 87 where the flows of the dope are unified. A supporting belt 88 as a support is located under the multi-manifold solution casting die 83, and receives the dope 84, 85 and 86 cast thereon. Gel film 89 is formed, and stripped to advance a self-supporting film. The polymer film will be described later.

Figure 6:
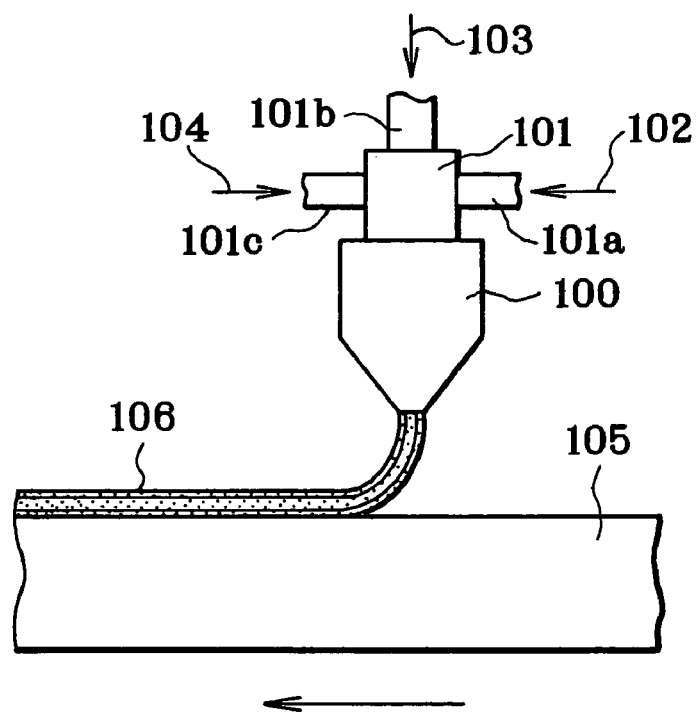
FIG. 6 is a side elevation, partially broken, illustrating a solution casting die with plural inlet conduits.

Another preferred multi-layer solution casting process is described. In FIG. 6, there is a solution casting die 100. A feed block 101 is positioned upstream from the solution casting die 100. Inlet conduits 101a, 101b and 101c are connected with the feed block 101. Dope 102, high-density dope 103 and dope 104 is supplied by a dope supply device (not shown), and sent through the inlet conduits 101a–101c to the feed block 101. The feed block 101 causes convergence of the dope 102–104. There is a supporting belt 105 as a support, on which the solution casting die 100 casts the combination of the dope 102–104. Gel film 106 is formed on the supporting belt 105, and stripped as self-supporting cast film, which is dried to obtain polymer film. The polymer film produced according to the multi-layer solution casting process will be described later in detail. Note that a rotating supporting drum may be used instead of the supporting belt 105 of FIGS. 5 and 6.

Figure 7:
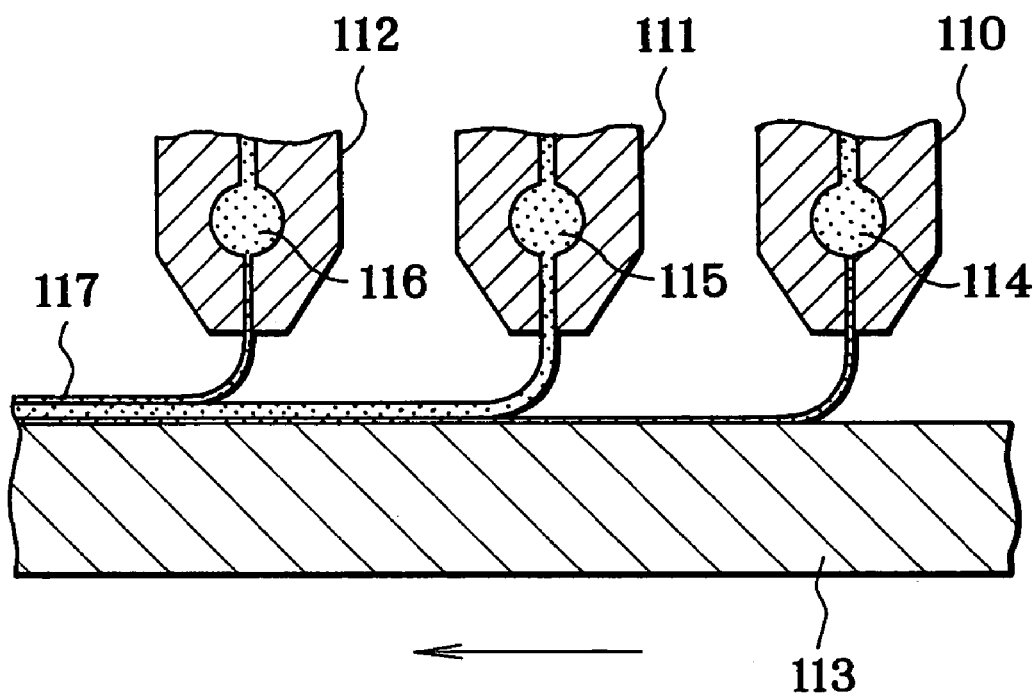
FIG. 7 is a cross section, partially broken, illustrating a set of plural solution casting dies.

In FIG. 7, another preferred solution casting process of a successive type according to the invention is illustrated. Three solution casting dies 110, 111 and 112 are arranged on one line over a supporting belt 113 as a support. The solution casting dies 110, 111 and 112 are supplied with respectively dope 114, high-density dope 115 and dope 116 by a dope supply device (not shown). The dope 114–116 is successively cast on to the supporting belt 113 in three serially arranged portions. Gel film 117 is formed, and stripped to advance a self-supporting cast film, which is dried to constitute polymer film. The polymer film will be described later.

Figure 8:
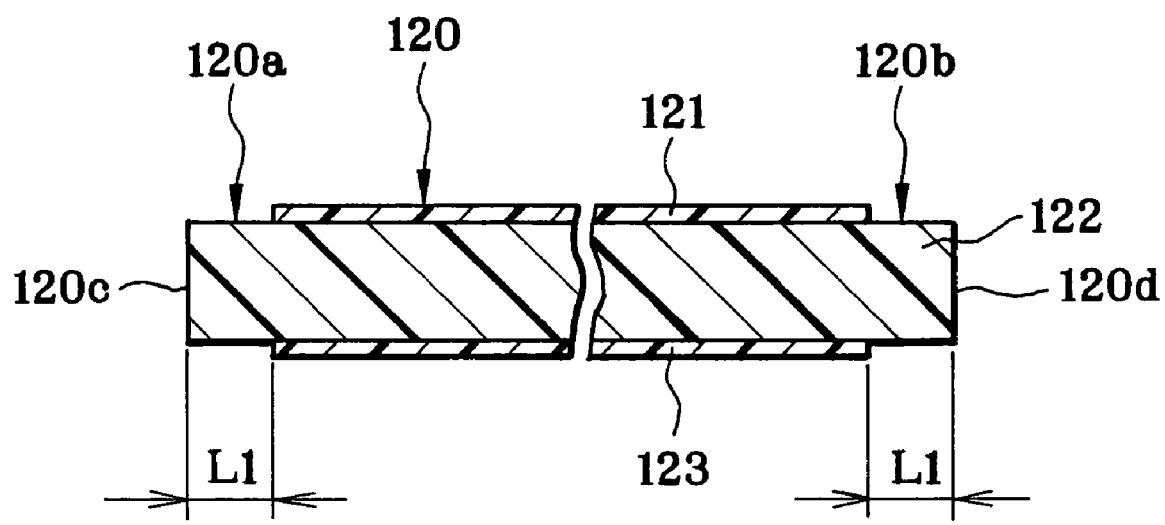
FIG. 8 is a cross section illustrating multi-layer self-supporting cast film with a second film layer extending with higher strength.

In FIG. 8, self-supporting cast film or soft film 120 of a triple-layer structure is illustrated as cast film obtained by any of the multi-layer solution casting processes of FIGS. 5–7 which include multi-manifold solution casting and successive solution casting. Note that the term of the modulus of the longitudinal elasticity of the self-supporting cast film 120 is used, but the same is also referred to as film strength. The self-supporting cast film 120 includes a first film layer 123, a second film layer 122 overlaid on the first film layer 123, and a third film layer 121 overlaid on the second film layer 122.

In the present invention, the high-density dope 85 (FIG. 5), the high-density dope 103 (FIG. 6) and the high-density dope 115 (FIG. 7) for forming the second film layer 122 has higher density than the dope 84 and 86 (FIG. 5), the dope 102 and 104 (FIG. 6), and the dope 114 and 116 (FIG. 7) for forming the third film layer 121 and the first film layer 123. The second film layer 122 has a higher strength.

In accordance with the solution casting of the multi-manifold type and the successive type, widths of casting of each of the layers can be controlled individually. The second film layer 122 is cast by use of the high-density dope. Each of the first and third film layers 121 and 123 is cast by use of the dope with lower density than the high-density dope. Consequently, layers with higher film strength are formed particularly in lateral edge portions 120a and 120b, which should be specially protected from curls. The dope for the first and third film layers 121 and 123 has the normal density which is effective in obtaining high quality of the outer surfaces of the polymer film. Let L1 (mm) be a size or width of the lateral edge portions 120a and 120b as measured from lateral edges 120c and 120d of the self-supporting cast film 120. The most preferable value of L1 is 10 mm. A preferred example of the high-density dope may include 20–25 wt. % of the solid content, so that the lateral edge portions 120a and 120b of the self-supporting cast film 120 can have the modulus of the longitudinal elasticity of 450,000 Pa or more. A preferred example of the dope with the lower density may include 15–20 wt. % of the solid content for obtaining high quality in the surfaces. However, the dope used herein may have any suitable density. The number of the layers formed according to the multi-layer solution casting may be two, or four or more instead of the three.

Figure 9A:
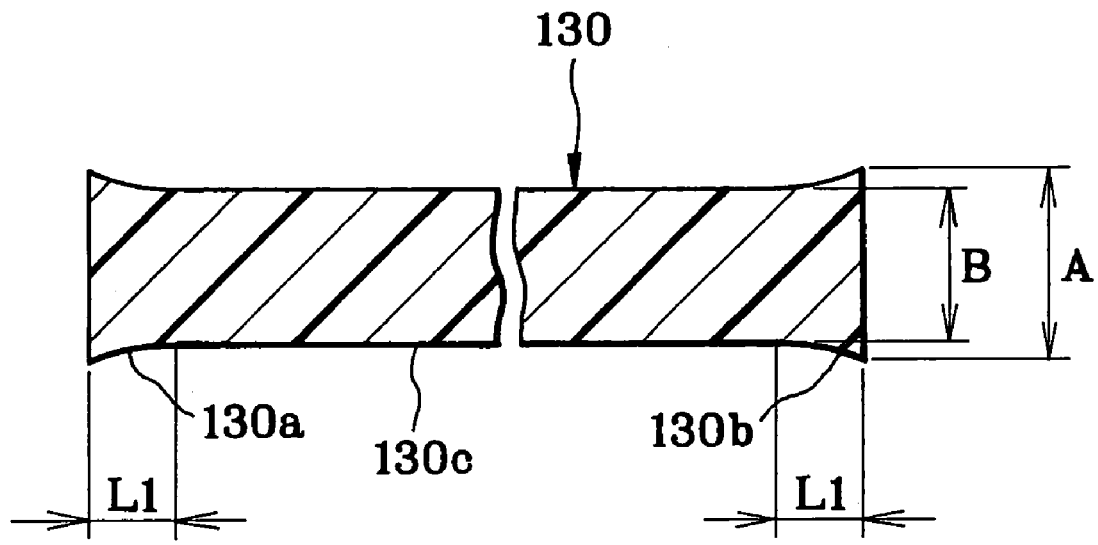
FIG. 9A is a cross section illustrating self-supporting cast film with lateral edge portions having a larger thickness.
Figure 9B:
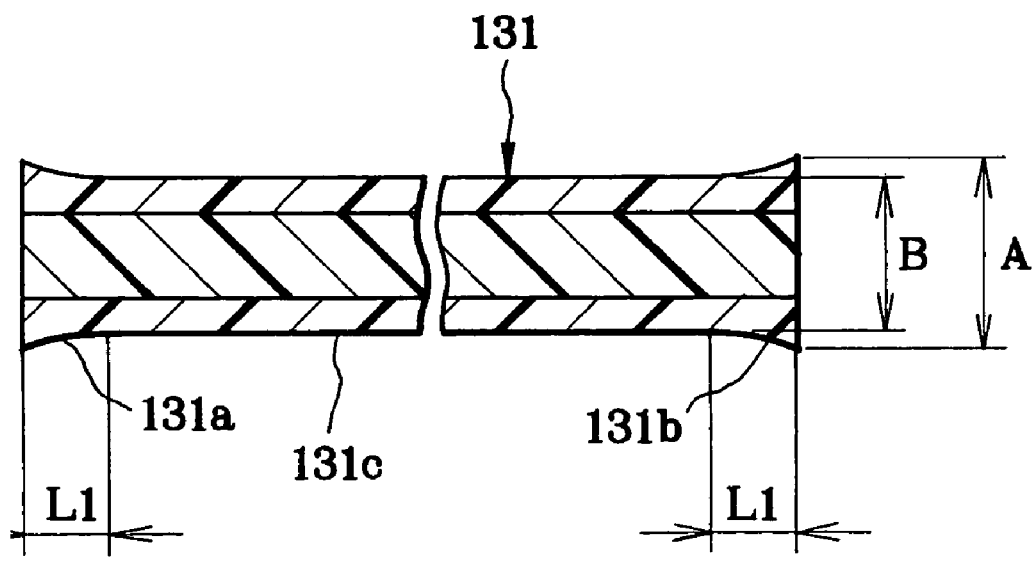
FIG. 9B is a cross section illustrating multi-layer self-supporting cast film with lateral edge portions having a larger thickness.
Figure 10:
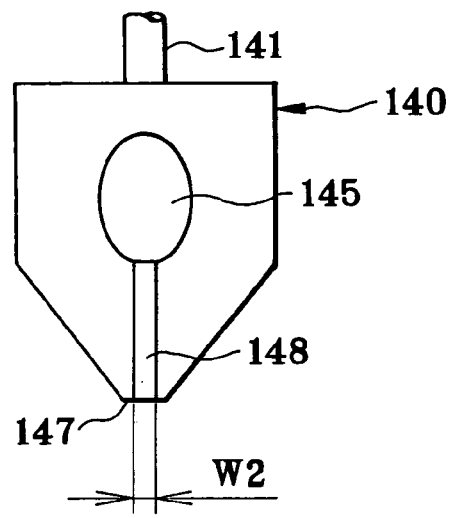
FIG. 10 is a side elevation illustrating a solution casting die for producing the self-supporting cast film of FIG. 9A.
Figure 11:
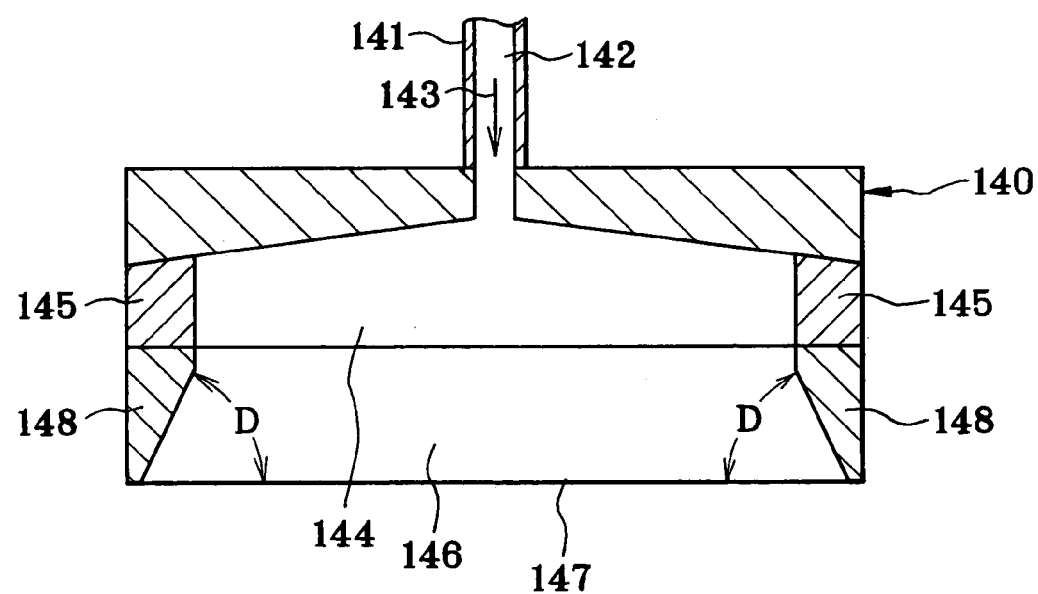
FIG. 11 is a cross section illustrating the same as FIG. 10.

In FIGS. 9A and 9B, other preferred embodiments of self-supporting cast film are illustrated. Self-supporting cast film or soft film 130 in FIG. 9A includes a middle portion 130c and lateral edge portions 130a and 130b having a greater thickness than the middle portion 130c. To form this, a solution casting die 140 in FIGS. 10 and 11 is used. A dope supply conduit 141 is connected with the solution casting die 140. Dope 143 is caused to flow through the dope supply conduit 141 in a path 142 to the solution casting die 140. A manifold 144 in the solution casting die 140 spreads the flow of the dope 143 to a width of the casting. There are manifold plugs 145 for closing openings at the manifold 144 to prevent leakage of the dope 143. A die channel 146 in the solution casting die 140 causes a die lip 147 to cast the dope 143 on to a supporting surface (not shown). Deckle panels 148 for spreading define inner surfaces of the die channel 146.

The surfaces of the deckle panels 148 are inclined at an angle D of the inclination relative to the die lip 147. Note that a sign W2 is used to denote a width of the die channel 146 at the die lip 147 in a direction of the thickness of the bead. See FIG. 10.

In FIG. 9A, let A (microns) be a thickness of the lateral edge portions 130a and 130b of the self-supporting cast film 130. Let B (microns) be a thickness of the middle portion 130c which is other than the lateral edge portions 130a and 130b in the self-supporting cast film 130. The solution casting die 140 is constructed by optimizing the inclination angle D and the die channel width W2 of the die channel 146. This enables casting in the condition of A>B. In general, the flexural rigidity of a thin object is directly proportional to the cube of the thickness of the object. Thus, the control of the thickness A of the lateral edge portions 130a and 130b is effective for controlling the curls. The most preferable value of the width L1 of the lateral edge portions 130a and 130b is 10 mm. The thickness A (microns) of the lateral edge portions 130a and 130b satisfies a condition $30 \leq A \leq 560$, preferably $100 \leq A \leq 400$, and desirably $150 \leq A \leq 350$. Should the thickness A be 30 microns or less, it is likely that a small curl will remain without being suppressed. Should the thickness A be 560 microns or more, residual deposit of the polymer will remain on the supporting surface particularly in the case of the high amount of the volatilized component in the self-supporting cast film 130.

Furthermore, a ratio between the thicknesses A and B can preferably satisfy a condition of $$1 \leq A/B \leq 5.$$

Should the ratio A/B be smaller than 1, no effect of suppressing curls will be obtained because of too small a difference in the flexural rigidity. Should the ratio A/B be greater than 5, feeding of the self-supporting cast film 27 will be influenced, for example because a partially remaining portion of the self-supporting cast film 130 will be stuck on the supporting surface.

For the purpose of determining the thickness A of the lateral edge portions 130a and 130b in the above-described range, the width W2 (microns) of the die lip 147 satisfies a condition $500 \leq W2 \leq 2,000$, preferably $700 \leq W2 \leq 1,500$, and desirably $800 \leq W2 \leq 1,000$. Also, the inclination angle D (degrees) of the deckle panels 148 satisfies a condition $30 \leq D \leq 90$, preferably $40 \leq D \leq 70$, and desirably $50 \leq D \leq 60$.

The self-supporting cast film according to the invention may have a multi-layer form unlike that of FIG. 159A. In FIG. 9B, a triple-layer structure of self-supporting cast film or soft film 131 is obtained by multi-layer solution casting, or either one of the multi-manifold solution casting and successive solution casting.

Lateral edge portions 131a and 131b can preferably satisfy the above-described condition related to the self-supporting cast film 130. A middle portion 131c is included in the self-supporting cast film 131, and has the thickness B. The ratio between A and B can preferably satisfy the above-described condition related to the self-supporting cast film 130. Note that, if the thickness is different between the lateral edge portions 131a and 131b, the symbol of the thickness A is used to denote the smaller thickness of those of the lateral edge portions 131a and 131b. The term of the middle portion 131c is used to mean a portion to become a product of polymer film obtained after slitting. The number of the layers formed by the multi-layer solution casting may be two, or four or more in place of the three.

According to the present embodiment, only the lateral edge portions of the second surface 27b are forcibly cooled at ends of the lower feed rollers 34–36 inside the transition unit 30 of FIG. 2, so as to suppress occurrence of curls. In FIG. 12, a feed roller set 150 is constituted by an upper feed roller 151 and a lower feed roller 152.

The upper feed roller 151 is disposed to contact the first surface 27a of the self-supporting cast film 27. The lower feed roller 152 is disposed to contact the second surface 27b of the self-supporting cast film 27. A drive mechanism (not shown) causes the upper and lower feed rollers 151 and 152 to rotate, to feed the self-supporting cast film 27 in the transition unit 30. The lower feed roller 152 is constituted by a middle roll 152b, and first and second chill rolls 152a and 152c disposed at ends of the middle roll 152b. Coolant supply conduits 153 and 154 are associated with the first and second chill rolls 152a and 152c, and cause coolant to flow for the cooling operation of the first and second chill rolls 152a and 152c. Paths 155 and 156 connect the coolant supply conduit 153 to the temperature adjustor 37. Similarly, paths 157 and 158 connect the coolant supply conduit 154 to the temperature adjustor 37.

It is to be noted that, despite the above description, only a first one of the upper and lower feed rollers 151 and 152 can be rotated by use of a motor. The second of those can be rotated by feeding of the self-supporting cast film 27.

There is a temperature sensor (not shown), which measures the temperature of the first and second chill rolls 152a and 152c. According to the measured temperature, coolant is caused to flow through the path 155, the coolant supply conduit 153, the first chill roll 152a and the path 156. A lateral edge portion 27c is cooled by the first chill roll 152a. Also, coolant is caused to flow through the path 157, the coolant supply conduit 154, the second chill roll 152c and the path 158. A lateral edge portion 27d is cooled by the second chill roll 152c. This encourages condensation of the gaseous solvent in the lateral edge portions 27c and 27d on the second surface 27b. The drying speed difference between the second surface 27b and the first surface 27a can be reduced, to minimize the curled degree. Let L2 be a size of the first and second chill rolls 152a and 152c as measured from lateral edges 27e and 27f in the width direction of the self-supporting cast film 27. It is preferable that L2 is 10 mm. Examples of the coolant may include glycol types, fluorine types, alcohol types and the like, and may be a mixture of at least two of those.

In the transition unit 30 of FIG. 2, three pairs of rollers are contained. However, the best of possible variants is to cool all of the portions of the second surface 27b corresponding to the end portions of the lower feed rollers 34–36 as illustrated in FIG. 12. This is effective in suppressing occurrence of curls in the self-supporting cast film 27. Furthermore, rollers for cooling the second surface 27b may not be combined in plural pairs in each of which two rollers are opposed directly to each other as illustrated in FIG. 12. For example, the decurling and rotatable rollers 71–75 in FIG. 4 are disposed in the zigzag form in the transition unit 70. At least one of the lower rotatable rollers 73–75 can be constructed for cooling for the purpose of suppressing occurrence of curls. In this structure, it is desirable to use two chill rolls at ends of the feed roller 73 disposed in the upstream position. The best of those variants is to cool all of the lateral edge portions of the second surface 27b corresponding to the end portions of the lower rotatable rollers 73–75.

[Polymer Film]

According to the solution casting of the invention, it is easily possible to produce the polymer film with a small thickness of 15–150 microns. The thickness of the polymer film is preferably 35–65 microns, and desirably 35–60 microns.

The polymer film 28 obtained by the solution casting of the present invention can be used as an optical film or protective film on a polarizing plate. Also, such a polarizing plate protective film can be attached to each of two surfaces of a polarizing film formed from polyvinyl alcohol or other polymers, so as to construct a polarizing plate. Further examples of uses of the polymer film 28 include an optical compensation film, anti-reflection film, and the like. The optical compensation film includes the polymer film 28 and an optical compensation sheet attached to the polymer film 28. The anti-reflection film includes the polymer film 28 and an anti-glare layer overlaid thereon. A liquid crystal display panel or display device can be constructed by use of such film with high quality, because high quality of the surfaces of the polymer film 28 can be obtained.

EXAMPLES

Preferred examples of the invention are hereinafter described. At first, preparation of the dope for use in the experiments is described. Experiment 1 was conducted for observing wrinkles of the self-supporting film and residual adhesion to the self-supporting rollers. For Experiment 1, details of the condition are described with Example 1 and Comparable examples 1–6. Portions of the condition in Comparable examples 1–6 the same as those of Example 1 are not further described. Results in relation to the condition are indicated in Table 1. Then Experiment 2 was conducted for observing occurrence of curls. Specifically, portions of the condition in Experiment 2 the same as those of Experiment 1 are not further described. For Experiment 2, details of the condition are described with Examples 2–4 and Comparable examples 7 and 8. Portions of the condition in Examples 3 and 4 and Comparable examples 7 and 8 the same as those of Example 2 are not further described. Results in relation to the condition are indicated in Table 2.

[Preparation of Dope A]

The solvent was constituted by mixture of 85 wt. % of dichloro methane, 12 wt. % of methanol, and 3 wt. % of n-butanol. A ratio of the mixed solvent was 100 parts by weight. The solid content or solute polymer had 26.8 parts by weight of cellulose triacetate (TAC) with a ratio of acetylation of 60.9%. Plasticizers as additives were added to the solvent, and included 2.1 parts by weight of triphenyl phosphate (TPP), and 1.1 parts by weight of biphenyl diphenyl phosphate (BDP). Thus, the dope A was obtained. The dope A had viscosity of 100 Pa·s at the temperature of 30° C., storage modulus of elasticity of 100,000 Pa at the temperature of −5° C. Then the dope A was contained in the mixing tank 11. It is to be noted that the value of parts by weight of the solute is used to mean a proportion relative to the amount of the mixed solvent.

[Preparation of Dope B]

The solvent was constituted by mixture of 85 wt. % of methyl acetate, 5 wt. % of acetone, 5 wt. % of ethanol, and 5 wt. % of n-butanol. A ratio of the mixed solvent was 100 parts by weight. The solid content or solute polymer had 26.8 parts by weight of cellulose triacetate (TAC) with a ratio of acetylation of 59.6%. Plasticizers as additives were added to the solvent, and included 2.1 parts by weight of triphenyl phosphate (TPP), and 1.1 parts by weight of biphenyl diphenyl phosphate (BDP). Thus, the dope B was obtained. The dope B had viscosity of 100 Pa·s at the temperature of 30° C., storage modulus of elasticity of 12,000 Pa at the temperature of −5° C. Then the dope B was contained in the mixing tank 11.

Experiment 1

Example 1

The polymer film producing system 10 in FIG. 1 was used for the polymer film production. The solution casting die 21 was a coat hanger type of die. A surface of the supporting drum 22 was subjected to plating of hard chromium, and finished according to the mirror surface finish in order to impart a surface roughness of 0.04 S to the supporting drum 22. The feed rollers 31–36 in the transition unit 30 had surface roughness Ra of 0.2 micron, static friction coefficient μ0 of 0.04, and dynamic friction coefficient μ of 0.02. The ratio V2/V1 of the peripheral speed V2 of the lower feed roller 36 to the peripheral speed V1 of the lower feed roller 35 was determined 1.05. The ratio V1/V0 of the peripheral speed V1 of the lower feed roller 35 to the peripheral speed V0 of the lower feed roller 34 was also determined 1.05.

After the above conditions are determined, the dope A at 30° C. was cast on to the supporting drum 22 at the casting speed of 50 meters per minute in a manner of targeting a thickness of 40 microns for the polymer film 28 after being dried. The gel film 25 is stripped by the stripping roller 26 to obtain the self-supporting cast film 27. The modulus of longitudinal elasticity of the self-supporting cast film 27 was measured by use of a load cell, and was found 500,000 Pa. The self-supporting cast film 27 was 60 microns thick. In the transition unit 30, the cooler blower assembly 38*b* beside the first surface 27*a* blew the cold gas 39 at −5° C. to the self-supporting cast film 27 to cool the surfaces of the self-supporting cast film 27 down to −5° C. See FIG. 2. Furthermore, the self-supporting cast film 27 was dried in the tenter drier machine 50 at 135° C. for three (3) minutes, and then dried in the drying chamber 51 at 145° C. for 15 minutes, and cooled in the cooling chamber 53 at 60° C. for two (2) minutes. The polymer film 28 was obtained, and wound by the winder 54. The polymer film 28 was observed by human eyes. As a result, a good product was obtained because of no occurrence of wrinkles (A), no occurrence of residual adhesion to the feed rollers 31–36 (A). Also, retardation of surfaces of the polymer film 28 was measured, and was found 2 nm. The polymer film 28 being obtained had good optical quality because of no optical anisotropy.

Comparable Examples 1–6

The solution casting of the condition was the same as Example 1 but with differences specifically indicated in Table 1. In Comparable example 2, the self-supporting film was cast with a thickness of 25 microns for the purpose of finely forming the polymer film with a thickness of 17 microns. The condition and results of the experiment are indicated in Table 1.

TABLE 1

|  | Example 1 | Comp. Example 1 | Comp. Example 2 | Comp. Example 3 |
|---|---|---|---|---|
| Modulus (Pa) of longitudinal elasticity | 500,000 | 400,000 | 500,000 | 500,000 |
| Thickness (microns) of the cast film 27 upon being stripped | 60 | 25 | 25 | 60 |
| Temperature (° C.) of the cast film 27 | −5 | 3 | −5 | −5 |
| Surface roughness Ra (microns) of the feed rollers | 0.2 | 0.04 | 0.2 | 0.04 |
| Static friction coefficient μ0 | 0.04 | 0.034 | 0.04 | 0.04 |
| Dynamic friction coefficient μ | 0.02 | 0.017 | 0.02 | 0.02 |
| Ratio V2/V1 between the peripheral speeds | 1.05 | 1.002 | 1.05 | 1.05 |
| Straining rate (1/s) in the extension of the cast film 27 | $1.4 \times 10^{-3}$ | $1.3 \times 10^{-3}$ | $1.4 \times 10^{-3}$ | $1.4 \times 10^{-3}$ |
| Occurrence of wrinkles | A | C | B | A |
| Occurrence of residual adhesion | A | C | A | B |

|  | Comp. Example 4 | Comp. Example 5 | Comp. Example 6 |
|---|---|---|---|
| Modulus (Pa) of longitudinal elasticity | 500,000 | 500,000 | 500,000 |
| Thickness (microns) of the cast film 27 upon being stripped | 60 | 60 | 60 |
| Temperature (° C.) of the cast film 27 | −5 | −5 | −5 |
| Surface roughness Ra (microns) of the feed rollers | 0.2 | 0.2 | 0.2 |
| Static friction coefficient μ0 | 0.04 | 0.04 | 0.034 |
| Dynamic friction coefficient μ | 0.02 | 0.02 | 0.017 |

TABLE 1-continued

| | | | |
|---|---|---|---|
| Ratio V2/V1 between the peripheral speeds | 1.2 | 1.05 | 1.05 |
| Straining rate (1/s) in the extension of the cast film 27 | $1.4 \times 10^{-3}$ | $1.3 \times 10^{-4}$ | $1.4 \times 10^{-3}$ |
| Occurrence of wrinkles | B | A | B |
| Occurrence of residual adhesion | A | B | A |

In Table 1, the signs A–C mean the following.
A: No occurrence of wrinkles or residual adhesion,
B: Occasionally limited occurrence of wrinkles or residual adhesion.
C: Clearly considerable occurrence of wrinkles or residual adhesion.

In Comparable example 1, wrinkles occurred, as indicated at the sign C in Table 1. Residual adhesion occurred on the rollers, as indicated at the sign C. In Comparable examples 3 and 5, no wrinkles was found, as indicated at the sign A. However, small or limited residual adhesion occurred on the rollers, as indicated at the sign B. In Comparable examples 4 and 6, small or limited wrinkles were found, as indicated at the sign B. However, no residual adhesion occurred on the rollers, as indicated at the sign B. It is concluded that Example 1 resulted in high quality because of successful suppression of wrinkles and residual adhesion. The polymer film of Comparable examples 2–6 had lower quality than Example 1 because of wrinkles and/or residual adhesion, but usable in a limited manner according to a product for use with the polymer film. Thus, the construction of Comparable examples 2–6 can be included in the scope of the present invention.

Experiment 2

Example 2

Polymer film was produced by the polymer film producing system 10 of FIG. 1 the same as that of Example 1. The temperature adjustor 23 was operated to keep the surface of the supporting drum 22 at the temperature of −5° C. In the transition unit 30, the feed rollers 31–36 had the surface roughness Ra of 0.2 micron, the static friction coefficient µ0 of 0.04, and the dynamic friction coefficient µ of 0.02. The ratio V2/V1 of the peripheral speed V2 of the lower feed roller 36 to the peripheral speed V1 of the lower feed roller 35 was 1.05. The ratio V1/V0 of the peripheral speed V1 of the lower feed roller to the peripheral speed V0 of the lower feed roller 34 was also 1.05.

After setting the above-described experimental condition, the dope A at 30° C. was cast on to the supporting drum 22 at the casting speed of 80 meters per minute with a purpose of obtaining a thickness of 40 microns for the polymer film 28 after being dried. The gel film 25 was stripped by the stripping roller 26 to obtain the self-supporting cast film 27. The modulus of longitudinal elasticity of the self-supporting cast film 27 was measured by a load cell, and found 500,000 Pa. The self-supporting cast film 27 was 60 microns thick. The temperature adjustor 37 was operated to keep the surface of the feed rollers 31–36 at the temperature of −5° C. The drying speed difference dW/dt between the first and second surfaces 27a and 27b in the transition unit 30 was 0.04 kg solvent per kg of solid per second. The thickness A of the lateral edge portions 130a and 130b of the self-supporting cast film 27 was 25 microns. The ratio A/B of A to the thickness B of the middle portion 130c was 0.42. See FIG. 9A. Furthermore, the self-supporting cast film 27 was extended and dried by the tenter drier machine 50 at 120° C. and at an extension ratio of 4% in the width direction for 10 seconds. The amount W1 of the volatilized component of the solvent was 15 wt. %. Then the self-supporting cast film 27 was dried in the drying chamber 51 at 145° C. for 15 minutes, and then cooled in the cooling chamber 53 at 60° C. for two (2) minutes. The polymer film 28 was obtained and wound by the winder 54. Retardation of surfaces of the polymer film 28 was measured and found 1.5 nm. Finally, the polymer film 28 with good optical quality was obtained because of no optical anisotropy.

[Evaluation of Curls]

1. Evaluation of the Curl of the Whole Surface

The whole surface of the polymer film after being dried was evaluated for curls according to the following process. Samples were cut and obtained from the polymer film at a size being 3×35 mm in a long shape as viewed in the width direction of the polymer film. The samples were kept dipped in water of 20–25° C. for three (3) minutes. After this, the curled amount was observed by human eyes viewing vertically downwards. The smallest unit of the measurement was 0.1 mm. Five (5) points arranged in the width direction were taken out from each of the samples, to determine an average curled amount Cav (cm$^{-1}$). The following is grades of the evaluation.
A: $-0.1 \leq Cav < 3.5$
B: $3.5 \leq Cav < 5$
C: $Cav \geq 5$ As a result of Example 2, Cav was 1 cm$^{-1}$, and found excellent as a product of grade A.

2. Evaluation of the Curl of the Lateral Edge Portions

The lateral edge portions of the polymer film in the dried state were sampled in the same process as that for the whole surface curls in the Item 1, and subjected to the processing, measurement and evaluation. As a result of Example 2, the average curled amount of the lateral edge portions was 1.5 cm$^{-1}$, and found excellent as a product of grade A.

Example 3

The producing system the same as Example 2 was used but with a difference of a change in the polymer film producing system 10 to that illustrated in FIG. 3. The decurling roller 61 had the surfaces kept at the temperature of −5° C. by the temperature adjustor 63. The dope B at 30° C. was cast on to the supporting drum 22 at the casting speed of 80 meters per minute with a purpose of providing the polymer film 28 with a thickness of 40 microns after being dried. Then the gel film 25 was stripped by the stripping roller 26 to obtain the self-supporting cast film 27. The modulus of longitudinal elasticity of the self-supporting cast film 27 was measured by use of a load cell, and was found 450,000 Pa. The self-supporting cast film 27 was 60 microns thick. The feed rollers 31–36 had the surface kept at 2° C. by the temperature adjustor 63. The decurling roller 61 was used to nip the self-supporting cast film 27 at the pressure of 0.2 kPa. The drying speed difference dW/dt between the first and second surfaces 27a and 27b inside the transition unit 30 was 0.02 kg solvent per kg of solid per second. After this, the condition was set without differences from that of Example 2. Retardation of surfaces of the polymer film 28 was measured, and was found 1.8 nm. The polymer film 28 being obtained had good optical quality because of =no optical anisotropy. According to the measuring process the same as Example 2, curls of the whole surfaces and the lateral edge portions were measured. As a result of Example 3, the curled amount was excellent for a product because of a small curled amount even for the two curling manners.

Example 4

The basic construction of the polymer film producing system 10 was the same as Example 2 but with a difference in that the surface of the supporting drum 22 was kept at 20° C. The dope B at 30° C. was cast on to the supporting drum 22 so as to provide the polymer film 28 with a thickness of 40 microns after being dried. Then the gel film 25 was stripped by the stripping roller 26 to obtain the self-supporting cast film 27. The modulus of longitudinal elasticity of the self-supporting cast film 27 was measured by use of a load cell, and was found 450,000 Pa. The self-supporting cast film 27 was 60 microns thick. The upper feed rollers 31 and 32 and the lower feed rollers 34 and 35 had the surface kept at 2° C. by the temperature adjustor 63. The drying speed difference dW/dt between the first and second surfaces 27a and 27b inside the transition unit 30 was 0.06 kg solvent per kg of solid per second. After this, the condition was set without differences from that of Example 2. Retardation of surfaces of the polymer film 28 was measured, and was found 1.5 nm. The polymer film 28 being obtained had good optical quality because of no optical anisotropy. According to the measuring process the same as Example 2, curls of the whole surfaces and the lateral edge portions were measured. As a result of Example 4, the curled amount was excellent for a product because of the small curled amount.

Comparable Examples 7 and 8

The condition for Comparable examples 7 and 8 was the same as that for Example 2 but with differences indicated in Table 2.

TABLE 2

|  | Ex. 2 | Ex. 3 | Ex. 4 | Comp. Ex. 7 | Comp. Ex. 8 |
|---|---|---|---|---|---|
| Dope type | A | B | B | A | A |
| Roller temperature (° C.) | −5 | 2 | 2 | 15 | −5 |
| Modulus (× 10³ Pa) of longitudinal elasticity | 500 | 450 | 450 | 300 | 500 |
| Drying speed difference | 0.04 | 0.02 | 0.06 | 0.06 | 0.04 |
| Use of the decurling roller 61 | — | o | — | — | — |
| Temperature (° C.) of the decurling roller 61 | — | −5 | — | — | — |
| Thickness A (microns) of the lateral edge portions | 25 | 25 | 66 | 25 | 66 |
| Ratio A/B of the thicknesses | 0.42 | 0.42 | 1.1 | 0.42 | 1.1 |
| Factor (%) of extension in the tenter 50 | 4 | 4 | 4 | 4 | 0.5 |
| Tenter temperature (° C.) | 120 | 120 | 120 | 120 | 70 |
| Amount (wt. %) of volatilized solvent | 15 | 15 | 15 | 15 | 4 |
| Curls of the whole surface | A | A | A | C | B |
| Curls of the lateral edge portions | A | A | A | C | A |

In Table 2, the unit of the drying speed difference is kg solvent per kg of solid per second.
A: No occurrence of curls,
B: Occasionally limited occurrence of curls,
C: Clearly considerable occurrence of curls.

As a result indicated in Table 2, Comparable example 7 had clearly remaining curls of the whole surfaces with the grade C, and clearly remaining curls of the lateral edge portions with the grade C. Comparable example 8 had occasionally limited remaining curls of the whole surfaces with the grade B, but had no remaining curls of the lateral edge portions with the grade A. The polymer film of Comparable example 8 had a small difficulty in relation to curls of the whole surfaces, but usable in a limited manner according to a product for use with the polymer film. Thus, the construction of Comparable example 8 can be included in the scope of the present invention.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A solution casting process comprising steps of:
    casting dope on to a support by use of at least one solution casting die, to form self-supporting cast film, said dope including polymer and solvent;
    stripping said self-supporting cast film from said support;
    drying said self-supporting cast film by use of a drier while said self-supporting cast film being stripped is fed by at least one feed roller, to form polymer film;
    wherein a surface temperature of said feed roller is set equal to or lower than 0° C., whereby said self-supporting cast film upon being stripped has modulus of longitudinal elasticity equal to or more than 450,000 Pa.

2. A solution casting process as defined in claim 1, further comprising a step of, while said self-supporting cast film is fed, blowing gas on said self-supporting cast film, said gas having a temperature equal to or lower than 0° C.

3. A solution casting process as defined in claim 2, wherein said self-supporting cast film includes first and second surfaces, and said first surface is separated from said support;
    said gas is blown on said second surface, so as to determine a drying speed difference (dW/dt) between said first and second surfaces equal to or less than 0.05 kg solvent per kg of solid per second.

4. A solution casting process as defined in claim 2, further comprising a step of, while said self-supporting cast film is fed, pressing a rotatable decurling roller on a first surface of said self-supporting cast film separated from said support, to prevent occurrence of a curl on said self-supporting cast film;
    wherein a surface temperature of said decurling roller is set equal to or lower than 0° C., so as to determine a drying speed difference (dW/dt) between said first surface and a second surface of said self-supporting cast film equal to or less than 0.05 kg solvent per kg of solid per second, said second surface being reverse to said first surface.

5. A solution casting process as defined in claim 2, wherein said casting step is according to at least one of multi-manifold solution casting and successive solution casting;

said dope comprises first to Nth dopes, said first dope has higher density than said second to Nth dopes, and is cast in a range extending to have two lateral edge portions of said self-supporting cast film, said second to Nth dopes are cast in a range of a middle portion between said two lateral edge portions, to provide said two lateral edge portions with said modulus of longitudinal elasticity equal to or more than 450,000 Pa.

6. A solution casting process as defined in claim 2, wherein two lateral edge portions of said self-supporting cast film upon being stripped has thickness A, and a middle portion of said self-supporting cast film disposed between said two lateral edge portions has a thickness B upon being stripped;

further comprising a step of forming said two lateral edge portions with said thickness A satisfying a condition that a ratio A/B to said thickness B is in a range of 1–5.

7. A solution casting process as defined in claim 2, wherein said self-supporting cast film includes first and second surfaces, and said first surface is separated from said support;

further comprising a step of, while said self-supporting cast film is fed, keeping two lateral edge portions of said second surface at temperature equal to or lower than a condensation temperature of said solvent, so as to condense and collect gas of said solvent thereon even in gasification from said self-supporting cast film.

8. A solution casting process as defined in claim 7, wherein said at least one feed roller comprises first and second feed rollers;

said first feed roller includes a middle roll for contacting at least a middle portion of said second surface, and first and second chill rolls, secured to respectively first and second ends of said middle roll, for contacting and cooling first and second lateral edge portions of said second surface;

said self-supporting cast film is nipped by contact of said second feed roller with said first surface in cooperation with said first feed roller.

9. A solution casting process as defined in claim 7, wherein said feed roller has a surface roughness Ra in a range of 0.05–0.5 micron.

10. A solution casting process as defined in claim 7, wherein said at least one feed roller comprises first and second feed rollers, said second feed roller is positioned-downstream from said first feed roller with reference to a feeding direction of said self-supporting cast film, said first and second feed rollers rotate at respectively peripheral speeds V1 and V2, and a ratio V2/V1 is in a range of 1.0025–1.1500.

11. A solution casting process as defined in claim 3, wherein said at least one feed roller comprises:
at least first and second feed rollers arranged in a feeding direction of said self-supporting cast film;
at least one third feed roller, disposed opposite to said first and second feed rollers with respect to said self-supporting cast film, and positioned between said first and second feed rollers with reference to said feeding direction.

12. A solution casting process comprising steps of:
casting dope on to a support, to form self-supporting cast film, said dope including polymer and solvent;
stripping said self-supporting cast film from said support;
drying said self-supporting cast film while said self-supporting cast film being stripped is fed, to form polymer film;
while said self-supporting cast film is fed, blowing gas on said self-supporting cast film, said gas having a temperature equal to or lower than 0° C., whereby said self-supporting cast film upon being stripped has modulus of longitudinal elasticity equal to or more than 450,000 Pa.

13. A solution casting process comprising steps of:
casting dope on to a support, to form self-supporting cast film, said dope including polymer and solvent;
stripping said self-supporting cast film from said support;
drying said self-supporting cast film while said self-supporting cast film being stripped is fed, to form polymer film;
while said self-supporting cast film is fed, pressing a first surface of said self-supporting cast film by use of a rotatable decurling roller, to prevent occurrence of a curl on said self-supporting cast film, said first surface having been separated from said support;
wherein a surface temperature of said decurling roller is set equal to or lower than 0° C., so as to determine a drying speed difference (dW/dt) between said first surface and a second surface of said self-supporting cast film equal to or less than 0.05 kg solvent per kg of solid per second, said second surface being reverse to said first surface.

14. A solution casting process comprising steps of:
casting first to Nth dopes on to a support according to at least one of multi-manifold solution casting and successive solution casting, to form self-supporting cast film in a multi-layer state, each of said first to Nth dopes including polymer and solvent;
stripping said self-supporting cast film from said support;
drying said self-supporting cast film while said self-supporting cast film being stripped is fed, to form polymer film;
wherein said first dope is cast in a range extending to have two lateral edge portions of said self-supporting cast film, said second to Nth dopes are cast in a range of a middle portion between said two lateral edge portions, said first dope having higher density than said second to Nth dopes, to provide said two lateral edge portions with modulus of longitudinal elasticity equal to or more than 450,000 Pa.

15. A solution casting process comprising steps of:
casting dope on to a support, to form self-supporting cast film, said dope including polymer and solvent;
stripping said self-supporting cast film from said support;
drying said self-supporting cast film while said self-supporting cast film being stripped is fed, to form polymer film;
wherein said self-supporting cast film upon being stripped is so formed that a ratio A/B of thickness A to thickness B is in a range of 1–5, where said thickness A is thickness of two lateral edge portions of said self-supporting cast film, and said thickness B is thickness of a middle portion of said self-supporting cast film disposed between said two lateral edge portions.

* * * * *